United States Patent Office 3,542,670
Patented Nov. 24, 1970

3,542,670
CATALYST COMPRISING SILICA-ALUMINA, SEPARATE PHASE ALUMINA AND CRYSTALLINE ALUMINO SILICATE
Henry Erickson, Park Forest, Ill., and Robert A. Sanford, Louisville, Ky., assignors to Sinclair Research, Inc., New York, N.Y., a corporation of Delaware
No Drawing. Continuation of application Ser. No. 540,827, Apr. 7, 1966. This application May 7, 1968, Ser. No. 727,332
Claims priority, application Canada, May 21, 1965, 931,320; June 7, 1965, 932,666
Int. Cl. C10g 11/02; B01j 11/40
U.S. Cl. 208—120          11 Claims

ABSTRACT OF THE DISCLOSURE

A hydrocarbon cracking catalyst which is highly selective yet unusually resistant to steam deactivation is prepared by admixing (a) a silica-alumina hydrogel with (b) an amorphous hydrous alumina or an alumina monohydrate having a crystallite size of up to about 50 A., or mixtures of the foregoing and (c) a crystalline alumino silicate having pores in the 8 to 15 A. size range and a silica-to-alumina mole ratio of greater than 3:1, followed by drying the admixture to convert the silica-alumina hydrogel to xerogel form. On a dry weight basis, the catalyst contains about 45 to 90% of the silica-alumina xerogel, about 5 to 50% of the alumina and about 1 to 50% of the alumino silicate.

---

This application is a continuation of copending application Ser. No. 540,827, filed Apr. 7, 1966 now abandoned.

This invention relates to an improve catalyst, its method of manufacture and its use in cracking higher boiling hydrocarbons to gasoline. The new catalyst is especially resistant to deactivation when contacted with high-temperature steam. Three essential components of the catalyst are drawn respectively from synthetic aluminas, synthetic silica-aluminas and zeolitic crystalline alumino silicates. Although each of these materials has heretofore been suggested for use in cracking catalysts we have found that combination of defined members of these groups gives a catalyst having outstanding properties.

There have been a wide variety of silica and alumnia-containing materials suggested as catalysts for enhancing the cracking of higher-boiling hydrocarbons to gasoline. Among these catalysts are clays, natural and synthetic zeolitic alumino silicates and synthetic silica-aluminas. In the usual cracking system regeneration of the catalyst removes carbonaceous deposits through burning and since the oxygen-containing gases supplied to the regeneration system contain water, and burning of the carbonaceous material which contain some hydrocarbons produces additional amounts of water, the catalyst is subjected to high-temperature steaming conditions. Thus, it is very desirable that a cracking catalyst exhibit over substantial operating periods, good resistance to deactivation when contacted with high-temperature steam.

For the most part, cracking catalysts are regenerated at an apparent or gas temperature of about 900 to 1300° F., and when evaluating the steam resistance of catalysts, temperatures in this range are often used. There is now a realization that the actual temperature of catalyst particles undergoing regeneration can be higher than many believed possible at the apparent temperatures mentioned. Thus, in an article by A. Bondi, R. S. Willer and W. C. Schlaffer entitled "Rapid Deactivation of Fresh Cracking Catalyst," I. & E. C. Process Design and Development, vol. 1, No. 3, pp. 196–203, July 1962, the authors point out conditions which can give rise to fresh catalyst particle temperatures of the order of 800° C., during regeneration. Thus, it is most advantageous for cracking catalysts to resist deactivation when contacted with steam at such temperatures. Moreover, since the time required to regenerate the catalyst is decreased as temperatures are raised and since regeneration capacity often limits the amount of hydrocarbon material which can be processed in the cracking reactor, the use of high regeneration temperatures is indeed attractive, especially if the desirable catalyst characteristics are not lost. For these reasons, we believe that evaluation of cracking catalyst is more meaningful if they are steamed at a temperature of the order of 1450° F., since a product which can withstand this condition offers considerable advantages to the petroleum refiner. The problem that therefore faces the art is the development of cracking catalysts which are not unduly deactivated by steam at such high temperatures.

When searching for new cracking catalysts, one possible approach involves evaluation of components previously employed and as noted above, these include among others, materials such as clays, synthetic silica-aluminas, and natural and synthetic zeolitic alumino silicates. Although the zeolites have been considered for many years as cracking catalysts, their crystalline forms were generally unavailable or were only available as they naturally-occur. If, of course, one wishes to consider adopting a cracking catalyst on a commercial scale, extensive volumes of the catalyst ingredients must be available at a cost commensurate with the value of the gasoline and other products derived from the cracking operation. Naturally-occurring materials are often available in only small amounts, but an even greater detriment to their use is their non-uniformity due to the presence of varying amounts and identities of foreign ingredients which aside from requiring the expense of changing processing conditions to give a product of more or less constant analysis, may actually be catalyst poisons. Also, due to the nature in which the foreign materials occur they may be difficult, if not impossible, to remove.

With the availability in recent years of synthetic crystalline alumino silicates, evaluation of these materials as cracking catalysts was undertaken. The alumino silicates having pores large enough to admit the hydrocarbons undergoing conversion in the cracking operation are of most interest since the total surface area of the particles can come into use. A property exhibited by crystalline alumino silicates, both natural and synthetic, is relatively uniform pore size and it is believed that this structure should be maintained to at least a considerable degree if the desirable catalytic properties are to be retained. Moreover, since the alumino silicates are generally available in the sodium form, most of this catalyst poison should be removed. Due to the relatively high cost of the crystalline alumino silicates, one wishes to use as little of this material which still permits the development of satisfactory catalyst properties.

One family of crystalline, zeolitic sodium alumino silicates has a relatively uniform pore size in the range of 8 to 15 A., most often 10 to 14 A. Among the first crystalline alumino silicates of this type which were offered to the petroleum industry was one having a silica-to-alumina mole ratio of about 2.5:1. Cracking catalysts made from such materials even when the sodium content is reduced by ammonium exchange, exhibit little, if any, improvement over the synthetic, amorphous silica-aluminas used widely in commercial cracking units, and any advantage afforded has not justified the added cost of the alumino silicate. Even when an extraneous metal, for instance a metal which is not a catalyst poison or is even a promoter such as cerium, is exchanged with the sodium of this alumino silicate, the catalyst is not particularly resistant to deactivation when steamed at temperatures of about 1450° F.

A crystalline sodium alumino silicate of 8 to 15 A. pore size later offered to the petroleum industry had a silica to alumina mole ratio of about 4.0 to 5.51, and a cracking catalyst component was made by removal of most of the sodium. As a result, catalysts composed of a mixture of a minor amount of such low sodium, crystalline alumino silicate and a major proportion of synthetic, amorphous silica-alumina have become available. In evaluating these materials, we found that improvement in their high-temperature steam stability was needed. Indeed, there was an indication that the loss in desirable catalyst properties upon steaming was greater than in at least certain catalysts which did not have the crystalline alumino silicate component.

By the present invention, we have devised a hydrocarbon cracking catalyst which not only exhibits high selectivity towards the production of gasoline rather than light gases and coke over long periods of time, but in addition the catalyst is unusually resistant to deactivation when treated with steam for several hours at temperatures of the order of 1450° F. The cracking catalyst of this invention is made by combining a silica-alumina hydrogel with a boehmite or amorphous hydrous alumina, and a crystalline alumino silicate having pores in the 8 to 15 A. range and a silica-to-alumina mole ratio greater than 3:1. The hydrous alumina component of this combination is, when analyzed by X-ray diffraction of dry samples, either one or a mixture of amorphous hydrous alumina and a monohydrate, e.g. boehmite, of less than about 50 A. crystallite size, preferably not greater than about 40 A. crystallite size, as determined by half-width measurements of the (0, 4, 1) X-ray diffraction line calculated by the Debye-Scherrer equation. The mixture of the three essential catalyst precursor ingredients is dried, for instance at temperatures of about 230 to 600° F., to convert the silica-alumina hydrogel to the xerogel form. The dried material can be calcined, for instance at a temperature of the order of about 700–1500° F., preferably about 800–1100° F. to provide an active catalyst. During calcination the separate hydrous alumina phase of our mixture is apparently converted to a gamma-family or activated alumina. When desired the dried material can be charged to the regenerator of a commercial cracking unit where calcination of the catalyst will take place.

In providing the mixture for drying, the three essential catalyst components can be combined in any suitable manner or order desired, but each of the components is in the mixture in finely-divided form, preferably the particles are principally less than about 300 mesh in size. The finely-divided material may have an average particle size of about 10 to 150 microns and can be used as such in a fluidized bed type of cracking operation. However, if desired, the mixture of catalyst components can be placed in macrosized form, that is, made into particles as by tabletting, extruding, etc. to sizes of the order of about 1/32″ to 1/2″ or more in diameter and about 1/32″ to 1″ or more in length, before or after drying or calcination. If formation of the macrosized particles is subsequent to calcination and the calcined particles have been contacted with water, the material may be recalcined either by charging to the regenerator of a cracking unit or by a separate treatment prior to use in the cracking system.

On a dry basis, the catalysts of the present invention contain about 45–90% of the synthetic, amorphous silica-alumina xerogel, about 5 to 50 weight percent of the separately added alumina phase, and about 1–50 weight percent of the crystalline alumino silicate, preferably the proportions of these ingredients are about 75–85%, about 10–25% and about 5–20%, respectively. The total alumina content, that is, the alumina from the silica-alumina xerogel and the separate alumina phase is about 20–60 weight percent, preferably about 25–50 weight percent, based on the three essential catalyst components when dried. The catalyst may also contain minor amounts of other materials and such ingredients are usually added to impart a desirable property to the catalyst without being significantly deleterious in other respects. Also, the cracking catalyst, when in a form suitable for use in the cracking operation, generally contains less than about 1.5 weight percent, preferably less than about 0.5 weight percent, sodium.

The crystalline alumino silicate of the present invention, whether synthetic or naturally-occurring has a pore size of 8–15 A. and preferably the pores have a size of 10–14 A. Usually, with a given material, the pores are relatively uniform in size and often the crystalline alumino silicate particles are primarily less than about 15 microns in size, preferably less than about 10 microns. In the crystalline alumino silicate the silica-to-alumina mole ratio is greater than 3:1 and is usually not above about 12:1, preferably being about 4 to 6:1.

The alumino silicate may be available in the sodium form, for instance with the sodium oxide to alumina mole ratio being about 0.7 to 1.1:1, often about 1:1 and this catalyst poison should not, as noted above, be present in substantial amounts in the catalyst when used in the cracking operation. The alumino silicate may also be used as a hydrate, for instance containing up to about 9 or more moles of water per mole of sodium oxide. The sodium or other objectionable ingredients can be removed before or after crystalline alumino silicate is added to either one or both of the other catalyst ingredients. Preferably most, if not essentially all, of the sodium is removed before the admixing even though in the preparation of the synthetic silica-alumina hydrogel, sodium is normally present and the amount appearing in the catalyst from this source may be controlled by water washing. Although sodium may be ion exchanged from the alumino silicate after its combination with the other catalyst ingredients this may give rise to the use of larger quantities of exchange solution.

Since in the catalyst of the present invention replacement of the sodium by another metal is not necessary to provide a catalyst of desirable characteristics, we prefer to exchange the sodium with ammonium ions, for instance through contact with an aqueous solution of ammonium chloride or another water-soluble ammonium compound. Subsequently, during drying and/or calcination the ammonium ion may break down to release ammonia and leave an acid site on the alumino silicate. In fact, such acid sites are quite conducive to obtaining satisfactory catalyst properties and we prefer that at least some of such sites be provided by either the ammonium ion, including organic ammonium ions, or hydrogen ions even though the exchange be accomplished at least in part by a nonpoisoning metal. On a molar basis, the ammonium or hydrogen ion is usually at least about 10% or even at least about 50%, based on the alumina content of the crystalline alumino silicate and it is preferred that these ions be essentially the only exchanging cations employed. The percentages of ion exchange may alternatively be based on the sodium content of a sodium alumino silicate. However, as noted before, suitable non-poisoning replacements for the sodium also include the polyvalent metals of the Periodic Chart including the rare earth metals such as cerium, etc. If one is going to replace the sodium with another metal such may with advantage be a cracking catalyst promoter. The Group IIa and rare earth metals are suitable but especially in the case of the rare earth metals the advantage, if any, emanating from the use of the metal may not justify the cost.

The second essential component of the catalyst precursor of the present invention is a synthetically precipitated silica-alumina hydrogel which contains about 55–90, preferably about 65–75, weight percent silica and about 10–45, preferably about 25–35, weight percent alumina, on a dry basis. The silica-alumina hydrogel can be prepared by any desired method and several procedures are known in the art. For instance, the amorphous hydrogel can be prepared by coprecipitation or sequential precipitation by either component being the initial material with a least the principal part of the silica or alumina being made in the presence of the other. Generally the alumina is precipitated in the presence of a silica gel. We prefer that the silica-alumina hydrogel be made by forming a silica hydrogel by precipitation from an alkali metal silicate solution and an acid such as sulfuric acid. Then alum solution may be added to the silica hydrogel slurry. The alumina is then precipitated by raising the pH into the alkaline range by the addition of an aqueous sodium aluminate solution or by the addition of a base such as ammonium hydroxide. Other techniques for preparing the silica-alumina hydrogel are well known in the art, and these techniques may be used in the practice of the invention.

The alumina hydrogel to be combined with the silica-alumina hydrogel is made separately from the silica-alumina hydrogel. The alumina hydrogel may be prepared, for example, by precipitation of alumina at alkaline pH by mixing alum with sodium aluminate in an aqueous solution or with a base such as soda ash, ammonia, etc. As noted above the alumina hydrogel is in the form of amorphous hydrous alumina or alumina monohydrate of up to about 50 A. crystallite size as determined by X-ray diffraction analysis. The amorphous hydrous alumina generally contains as much combined water as an alumina monohydrate. Mixtures of the monohydrate and amorphous forms of hydrous alumina are preferred and often this phase is composed of at least about 25% of each of the separate members.

In preparing our catalyst, we may separately filter the silica-alumina hydrogel and the hydrous alumina and intimately mix these materials, for instance by colloidal milling. Although in this particular procedure a low sodium crystalline alumino silicate is generally added after the milling, this ingredient may also be combined before the colloidal milling operation. The mixture is dried, water washed to acceptable concentrations of, for instance, sodium and sulfate and redried in the preferred procedure. The drying, especially the initial drying, is advantageously by spray drying to give microsphere.

The catalyst of this invention is especially useful in the cracking of heavier or higher boiling hydrocarbons to lower boiling products, especially gasoline. Typically, the feed is a petroleum or other hydrocarbon gas oil and is often a mixture of straight run and recycle gas oils. Cracking conditions are well known and often include temperatures of about 850–1100° F., preferably about 900–1050° F. Other reaction conditions usually include pressures of up to about 100 p.s.i.g., catalyst-to-oil ratios of about 5 to 25:1, and space velocities of about 3 to 60. The reaction is generally conducted in the essential absence of added free hydrogen and the catalyst may be employed as a fluidized bed of small particles or as a fixed or moving bed of larger or macrosize particles.

As noted above, the catalytic cracking system usually includes a regeneration procedure in which a portion of the catalyst is withdrawn from the cracking reactor and periodically contacted with free oxygen-containing gas in order to restore or maintain the activity of the catalyst by removing carbon. The regenerator gas temperature is generally about 900° to 1300° F., or more preferably about 1150 to 1250° F. Regenerated catalyst is returned to the cracking reactor.

The following examples of the manufacture and use of the catalyst of this invention are to be considered illustrative and not limiting.

EXAMPLE I

An alumina hydrogel is prepared as follows:

In a tank containing 5700 gallons of water at 85° F., are dissolved 300 lbs. of soda ash. When the soda ash has been dissolved, 180 gallons of a 39% concentration aqueous sodium aluminate solution are pumped into the tank in about a 15-minute period. The contents of the tank are at about 84° F. Six-hundred gallons of aqueous aluminum sulfate of 7.8% concentration, as $Al_2O_3$, are added to the admixture over an 80-minute period with water of dilution in conjunction with and in addition thereto diluting the reaction mass at a rate of 25 gallons per minute.

The pH of the resulting aqueous reaction mass is adjusted to 8.0 with about 75 gallons of 39% concentration aqueous sodium aluminate solution which, while being added, is also diluted continuously with water at a rate of 35 gallons per minute over a 7½ minute addition period. The contents of the tank are heated to about 100° F., and pumped to storage.

The precipitated, hydrated alumina is thereafter filtered on a large gel filter. The filtered product is partially purified by a one-cycle, water-wash on the filter on which it is collected. This filter is a string vacuum type drum filter with a built-in water spray nozzle directed toward the filter drum. Material on the drum is contacted with water as the drum rotates past the nozzle. After washing, the wet alumina hydrogel is stripped from the drum. This hydrogel analysis about 50% boehmite having a crystallite size of about 35° A., and 50% amorphous hydrous alumina as determined by X-ray diffraction on dried samples.

EXAMPLE II

A silica-alumina hydrogel is prepared by the following technique:

To a batch tank is added 4,275 gallons of water preheated to 90° F., and 865 gallons of sodium silicate solution (28.8 weight percent $SiO_2$, 40–41.5 Baumé at 68° F. and $Na_2O:SiO_2$ ratio of 1:3.2) is added. The batch is stirred for five minutes. The concentration of the sodium silicate, as $SiO_2$, in the batch is 6.3 weight percent.

With the batch at 90° F., 302 gallons of 34.5 weight percent sulfuric acid solution at 182° F. are added over a period of 45 minutes. The gel forms about 35 minutes after acid addition is begun. Then the pH is adjusted to 8.0–8.5. The batch is agitated for ten minutes.

Then 715 gallons of alum (7.8 weight percent, as $Al_2O_3$) is added to the gel over a period of about 36 minutes. The batch is agitated for an additional five minutes whereupon 205 gallons of sodium aluminate solution (24.4 weight percent of $Al_2O_3$) diluted in 1080 gallons of water is added over a period of 17 minutes. After all the sodium aluminate is added, the pH is checked. It should be between 5.0 and 5.2. The alumina content of the silica-alumina hydrogel is 30–31%.

EXAMPLE III

The silica-alumina hydrogel product of Example II and 1740 gallons of the alumina hydrogel filter cake of Example I are mixed together for one hour. The finished batch has a pH of 5.5 to 5.6 and a temperature of about 110° F. The aqueous gel mixture is then pumped to a dewatering filter, and the filter cake from said dewatering filter and a portion of aqueous gel are blended to give a gel slurry of about 14 weight percent solids. A portion of this hydrogel mixture was slurried, as a thick flowable paste, with a "Lightnin" stirrer fitted with a cage-beater and a propellor, for about 10 minutes to give a thorough dispersion. The product was stirred one minute at 14,500 r.p.m., in a Waring Blendor and dried in a laboratory spray-dryer. The spray-dried material, designated Catalyst A (197) was washed with $H_2O$ to acceptable impurity levels and dried at 230° F. The washed and dried material analyzed 0.08% $SO_4$ and less than 25 p.p.m. $Na_2O$.

EXAMPLE IV

A synthetic faujasite crystalline sodium alumino silicate of 1–3 micron particle size having pores of about 13 A., and analyzing, after calcination for 3 hours at 1200° F. 8.98% Na, 62.2% $SiO_2$, 22.7% $Al_2O_3$ and 1.18% volatile matter at 1000° C., was base exchanged with aqueous $NH_4NO_3$ and dried at 230° F., to 20.97% volatile matter at 1000° C. The base exchanged material on an ignited basis analyzed 1.87% Na.

135.4 grams of the dried, base exchanged, crystalline alumino-silicate and 1300 ml. of $H_2O$ were added to 10.52 lbs. of the crude $SiO_2.Al_2O_3/Al_2O_3$ mixed hydrogels manufactured according to Example III, while in the "Lightnin" mixer, and stirring was continued for 10 minutes. The resulting slurry was mixed for 1 minute at 14,500 r.p.m. in a Waring Blendor, spray-dried, water washed, and dried as in Example III. The product is Catalyst B (3255) Table I, which contains about 15% of the crystalline alumino silicate. A similarly prepared catalyst containing about 5% of the crystalline alumino silicate is designated Catalyst C (3241).

Table I below reports on cracking results obtaining using a standard test method in which an East Texas straight run light gas oil is cracked to gasoline at furnace temperature of about 900° F. Results are given for tests on spray dried microspherical forms of Catalysts A, B, C and others defined in the table. Before testing or steaming the catalyst microspheres, except for Catalyst E, were calcined for 3 hours at 1050° F. in dry air. Three sets of values are given in Table I. The first represents virgin activity of the calcined-unsteamed catalysts. The second set was obtained after the calcined catalyst had been heated for 24 hours at 1150° F., in one atmosphere of steam. The third set of data was obtained after the catalyst had been resteamed, this time for 6 hours at 1450° F., and one atmosphere pressure.

TABLE I

| Catalyst | A (197)[1] | B (3255)[2] | C (3241)[3] | D (070)[4] | E (122)[5] |
| --- | --- | --- | --- | --- | --- |
| Analysis: | | | | | |
| Percent alumina | 44.0 | 38.8 | 42.6 | 15.0 | 13.7 |
| Percent cerium | 0.0 | 0.0 | 0.0 | 0.0 | ~1.0 |
| P.p.m. sodium | <25 | 3,020 | 687 | 660 | 279 |
| Percent sulfur | <0.05 | <0.05 | <0.05 | | 0.03 |
| $N_2$ area, m.²/g | 437 | 555 | 459 | 575 | 175 |
| Total pore Volume, cc./g | 0.82 | 0.675 | 0.58 | 1.03 | 0.55 |
| Cracking tests: | | | | | |
| I. Calcined-unsteamed: | | | | | |
| Relative activity (RA) | 117.5 | 181 | 143.0 | 182.0 | 66.6 |
| Distillate plus loss (D+L) | 60.0 | 70 | 64.5 | 70.2 | 46.2 |
| Gas factor (GF) | 0.89 | 0.99 | 0.91 | 0.75 | 0.60 |
| Coke factor (CF) | 0.86 | 1.07 | 0.97 | 0.72 | 0.53 |
| Gas gravity (GG) | 1.43 | 1.28 | 1.38 | 1.54 | 1.51 |
| II. Steamed, 24 hrs. 1150° F.: | | | | | |
| Relative activity | 75.5 | 240 | 163.0 | 173.0 | 63.5 |
| Distillate plus loss | 49.1 | 76.3 | 67.5 | 69.0 | 45.2 |
| Gas factor | 0.89 | 0.65 | 0.62 | 0.52 | 0.67 |
| Coke factor | 0.76 | 0.56 | 0.47 | 0.37 | 0.54 |
| Gas gravity | 1.45 | 1.54 | 1.57 | 1.60 | 1.50 |
| III. Resteamed, 6 hrs. 1450° F.: | | | | | |
| Relative activity | 38.0 | 72.4 | 71.2 | 31.1 | 13.8 |
| Distillate plus loss | 34.9 | 48.2 | 47.7 | 31.0 | 18.5 |
| Gas factor | 1.01 | .65 | 0.67 | 0.75 | 1.12 |
| Coke factor | 0.75 | .48 | 0.40 | 0.84 | 1.67 |
| Gas gravity | 1.37 | 1.47 | 1.50 | 1.40 | 1.19 |

[1] $SiO_2.Al_2O_3+Al_2O_3$ from mixed boehmite-amorphous hydrous $Al_2O_3$.
[2] Catalyst A+15 percent crystalline $NH_4$-exchanged alumino silicate ($SiO_2/Al_2O_3=5.44/1$, and about 13 A.).
[3] Catalyst A+5 percent crystalline $NH_4$-exchanged alumino silicate ($SiO_2/Al_2O_3=5.44/1$ and about 13 A.).
[4] Commercially available $SiO_2.Al_2O_3$+crystalline $NH_4$-exchanged alumino silicate ($SiO_2/Al_2O_3=4.5$-$5.5/1$ and about 13 A.).
[5] Commercially available catalyst containing $SiO_2/Al_2O_3$, crystalline alumino silicate ($SiO_2/Al_2O_3=\sim 2.5/1$ and about 13 A.) and cerium.

By examining the data of Table I, it becomes immediately apparent that the catalysts of the present invention, i.e. Catalysts B and C are relatively resistant to deterioration by steam, even at 1450° F. Catalysts A and D, made from synthetic, amorphous silica-alumina and either alumina or crystalline alumino silicate of relatively high $SiO_2/Al_2O_3$, deteriorated badly in 1450° F., steaming. Catalyst E also showed a severe loss in activity and selectivity after the 1450° F., treatment.

EXAMPLE V

Catalyst AT, Table II, is a portion of virgin Catalyst A of Example III blended with 4% "Sterotex" die lubricant and formed into ⅛ x ⅛ inch cylinders with a Stokes BB-2 rotary tabletter, to about a 12 lb. crush. The tablets were muffle calcined, while raising the temperature about 300° F. each hour until a temperature of 1050° F., was reached. This temperature was maintained for 6 hours and then the catalyst was steamed for 24 hours at 1150° F., in one atmosphere steam.

EXAMPLE VI

Catalyst BT, Table II, is a portion of virgin Catalyst-B of Example IV tabletted, calcined and steamed similarly to Catalyst AT.

TABLE II

| Catalyst | AT | BT |
| --- | --- | --- |
| Physical properties: | | |
| Apparent density, g./cc | 0.572 | 0.566 |
| $N_2$ area, m.²/g | 415 | 471 |
| Total pore volume, cc./g | 0.85 | 0.84 |
| Test condition (block temperature 900° F.): | | |
| Catalyst temperature, ° F | 872 | 870 |
| Space velocity, Wo./Wc./Hr | 1.73 | 4.92 |
| Space velocity, Vo./Vc./Hr | 1.15 | 3.38 |
| Yields: | | |
| Wt. percent 410° F. EP gasoline, 60° F. flash | 35.1 | 48.4 |
| Wt. percent gas | 21.2 | 10.4 |
| Wt. percent coke | 3.2 | 1.0 |
| Gas gravity | 1.44 | 1.55 |
| Wt. percent conversion | 59.5 | 59.8 |
| Octanes, 410° F. gasoline: | | |
| Research octane, clear | 93.1 | 87.3 |
| Research octane, plus 3 cc. Tel | 99.8 | 97.3 |
| Corrected yields (weight percent on feed, from gasoline and gas analysis): | | |
| $C_6$–410° F. gasoline | 25.87 | 37.93 |
| $C_5$–410° F. gasoline | 34.61 | 46.08 |
| $C_4$–410° F. gasoline | 47.52 | 54.54 |
| Total $C_4$ | 12.91 | 8.46 |
| Isobutane | 6.58 | 4.59 |
| $C_4$ olefin | 5.17 | 2.72 |
| $C_3$ olefin | 4.41 | 2.13 |
| $C_3$–gas (dry gas) | 2.31 | 0.93 |

The performance data shown in Table II were obtained on a standard test unit, operating at 900° F., block temperature and feeding the same light gas oil used for the tests reported in Table I. Space velocities were adjusted to give 60% conversion. The tests were continued until sufficient product had been accumulated for complete evaluation, including gasoline octanes. Analyses were by Cat. A distillation, gas chromatography and mass spectrometry.

Catalyst AT shows the performance expected of a high quality synthetic catalyst. Catalyst BT, the catalyst of this invention, is superior to Catalyst AT in all respects. The weight space velocity permitted with Catalyst BT is about 3 times that for AT. Gasoline yield is higher and coke and gas yields lower with Catalyst BT.

EXAMPLE VII

Catalyst F (713), Table III was made from a silica-alumina hydrogel prepared as in Example II, while Catalyst G (236) was, similarly to Catalyst A, made from the mixed hydrogel prepared as in Example III. Catalyst H (725) was made by mixing 5%, on a dry basis, of the ammonium-exchanged, synthetic crystalline alumino-silicate of Example IV into a portion of silica-alumina hydrogel prepared as in Example II. Catalyst C of Table III (same as Catalyst C of Table I) was made by mixing 5% of the same alumino-silicate in the mixed hydrogel prepared as in Example III, as reported in Example IV, while Catalyst J (254) was made by mixing with the mixed hydrogel prepared as in Example III, 10% of cerium-ammonium-exchanged crystalline sodium alumino silicate in which the ratio of $SiO_2/Al_2O_3$ is about 2.5/1 and the pores are about 13 A. The processing (spray-drying, washing, etc.) of the samples was essentially identical. The catalysts were calcined and tested as in Example IV. Table III also lists the results from using Catalyst A, Table I, which is essentially a repeat of the tests on Catalyst C. Results obtained in test cracking using these catalysts were as follows:

weight percent alumina from a mixture of hydrous aluminas containing at least about 25 weight percent of each of amorphous hydrous alumina and alumina monohydrate having a crystallite size of up to about 50 A., and about 1–50 weight percent of a crystalline alumino silicate having a silica to alumina mole ratio greater than 3 to 12:1 and a pore size of 8–15 A., the total alumina content of said composition from said amorphous silica-alumina, and said alumina being about 20–60 weight percent, said silica-alumina xerogel being made by drying a corresponding silica-alumina hydrogel while in admixture with said mixture of hydrous aluminas and said crystalline alumino silicate.

2. The composition of claim 1 in which the mole ratio of silica to alumina in said crystalline alumino silicate is about 4 to 6:1.

3. The composition of claim 2 in which the crystalline alumina silicate has, through ion exchange, at least about 50 mole percent hydrogen ions based on the alumina content of said crystalline alumino silicate.

4. A composition comprising about 75–85 weight percent of synthetic, amorphous silica-alumina xerogel, said silica-alumina having about 65–75 weight percent silica and about 25–35 weight percent alumina, about 10–25 weight percent alumina from a mixture of hydrous aluminas containing at least about 25 weight percent of each of amorphous hydrous alumina and alumina monohydrate having a crystallite size of up to about 50 A., and about 5 to 20 weight percent of a crystalline alumino silicate having a silica to alumina mole ratio of about 4–6:1 and a pore size of 8–14 A., the total alumina content of said composition from said amorphous silica-alumina and alumina being about 25–50 weight percent, said silica-alumina xerogel being made by drying a corresponding silica-alumina hydrogel while in admixture with said mixture of hydrous aluminas and said crystalline alumino silicate, said composition containing less than about 1.5% sodium, and said crystalline alumino silicate having through ion exchange at least about 50 mole percent hy-

TABLE III

| Catalyst | F(713) [1] | G(236) [2] | A(197) [3] | H(725) [4] | C(3241) [5] | J(254) [6] |
|---|---|---|---|---|---|---|
| Analysis: | | | | | | |
| Percent sulfur | 0.07 | 0.088 | <0.05 | 0.05 | <0.05 | <0.05 |
| p.p.m. sodium | <50 | 166 | <25 | 485 | 687 | 685 |
| Cracking tests: | | | | | | |
| I. Calcined-unsteamed: | | | | | | |
| Relative activity (RA) | 135.0 | | 117.5 | 145 | 143.0 | 173.0 |
| Distillate plus loss (D+L) | 63.0 | | 60.0 | 64.7 | 64.5 | 69.4 |
| Gas factor (GF) | 0.82 | | 0.89 | 0.85 | 0.91 | 0.90 |
| Coke factor (CF) | 0.82 | | 0.86 | 0.85 | 0.97 | 0.87 |
| Gas gravity (CG) | 1.48 | | 1.43 | 1.41 | 1.38 | 1.38 |
| II. Steamed, 24 hrs. at 1,150° F.: | | | | | | |
| Relative activity | 76.3 | 65.0 | 75.5 | 85.5 | 163.0 | 135.0 |
| Distillate plus loss | 49.5 | 45.7 | 49.1 | 52.2 | 67.5 | 63.0 |
| Gas factor | 0.79 | 0.87 | 0.89 | 0.73 | 0.62 | 0.69 |
| Coke factor | 0.61 | 0.65 | 0.76 | 0.53 | 0.47 | 0.57 |
| Gas gravity | 1.53 | 1.41 | 1.45 | 1.51 | 1.57 | 1.52 |
| III. Resteamed, 6 hrs. at 1,450° F.: | | | | | | |
| Relative activity | 30.0 | 39.4 | 38.0 | 35.9 | 71.2 | 39.0 |
| Distillate plus loss | 30.5 | 35.5 | 34.9 | 33.7 | 47.7 | 35.5 |
| Gas factor | 0.99 | 0.90 | 1.01 | 0.94 | 0.67 | 1.00 |
| Coke factor | 0.76 | 0.71 | 0.75 | 0.61 | 0.40 | 0.69 |
| Gas gravity | 1.41 | 1.48 | 1.37 | 1.38 | 1.50 | 1.32 |

[1] $SiO_2 \cdot Al_2O_3$.
[2] $SiO_2 \cdot Al_2O_3 + Al_2O_3$ from mixed boehmite-amorphous hydrous $Al_2O_3$.
[3] $SiO_2 \cdot Al_2O_3 + Al_2O_3$ from mixed boehmite amorphous hydrous $Al_2O_3$.
[4] $SiO_2 \cdot Al_2O_3 + 5$ percent crystalline alumino silicate ($SiO_2 \cdot Al_2O_3$-5.44/1, and about 13 A.).
[5] $SiO_2 \cdot Al_2O_3 + Al_2O_3$ from mixed boehmite-amorphous hydrous $Al_2O_3$ and crystalline alumino silicate ($SiO_2 \cdot Al_2O_3$=5.44/1, and about 13 A.).
[6] $SiO \cdot Al_2O_3 + Al_2O_3$ from mixed boehmite hydrous $Al_2O_3$, and crystalline alumino silicate ($SiO_2 \cdot Al_2O_3$=~2.5/1, and about 13 A.).

This table shows the improvement of catalyst performance to be dependent upon the three-component catalyst of this invention (Catalyst C). Moreover, unless downstream facilities are limiting, the use of the catalyst of this invention in cracking will permit greater throughput of cracking feed. Where regeneration facilities are controlling, the far lower coke yield will reduce regenerator limitations.

What is claimed:

1. A composition comprising about 45–90 weight percent of synthetic, amorphous silica-alumina xerogel, said silica-alumina having about 55–90 weight percent silica and about 10–45 weight percent alumina, about 5–50 drogen ions based on the alumina content of said crystalline alumino silicate.

5. A method for producing gasoline which comprises contacting, under cracking conditions, a hydrocarbon boiling above the gasoline range with a catalytically-active composition of claim 1.

6. The method of claim 5 in which the hydrocarbon is a petroleum gas oil.

7. A method for producing gasoline which comprises contacting under cracking conditions, a hydrocarbon boiling above the gasoline range with a catalytically-active composition of claim 2.

8. A method for producing gasoline which comprises contacting, under cracking conditions, a hydrocarbon boiling above the gasoline range with a catalytically-active composition of claim 3.

9. The method of claim 7 in which the hydrocarbon is a petroleum gas oil.

10. The method of claim 8 in which the hydrocarbon is a petroleum gas oil.

11. A method for producing gasoline which comprises contacting, under cracking conditions, a hydrocarbon boiling above the gasoline range with a catalytically-active composition of claim 4.

References Cited

UNITED STATES PATENTS

| 3,140,253 | 7/1964 | Plank et al. | 208—120 |
| 3,312,615 | 4/1967 | Cramer et al. | 208—120 |

DANIEL E. WYMAN, Primary Examiner

C. F. DEES, Assistant Examiner

U.S. Cl. X.R.

252—455